（12）United States Patent
Amir

(10) Patent No.: US 6,912,853 B2
(45) Date of Patent: *Jul. 5, 2005

(54) METHOD OF AND APPARATUS FOR INCREASING THE OUTPUT OF A GEOTHERMAL STEAM POWER PLANT

(75) Inventor: Nadav Amir, Rehovot (IL)

(73) Assignee: Ormat Technologies, Inc., Sparks, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/229,265

(22) Filed: Aug. 28, 2002

(65) Prior Publication Data

US 2004/0040303 A1 Mar. 4, 2004

(51) Int. Cl.$^7$ .............................. F01K 27/00; F03G 7/00
(52) U.S. Cl. ...................... 60/641.5; 60/648; 60/641.2
(58) Field of Search ........................... 60/641.5, 641.2, 60/648

(56) References Cited

U.S. PATENT DOCUMENTS

| 5,038,567 | A | * | 8/1991 | Mortiz ................... 60/641.5 |
| 5,671,601 | A | * | 9/1997 | Bronicki et al. .......... 60/641.5 |
| 5,970,714 | A | * | 10/1999 | Bronicki et al. .......... 60/641.5 |
| 6,212,890 | B1 | * | 4/2001 | Amir ....................... 60/641.5 |

OTHER PUBLICATIONS

DiPippo, Ronald, Ph. D. "Small Geothermal Power Plants: Design, Performance and Economics." GHC Bulletin. Jun. 1999.

* cited by examiner

*Primary Examiner*—Sheldon J Richter
(74) *Attorney, Agent, or Firm*—Nath & Associates PLLC; Gary M. Nath; Jerald L. Meyer

(57) ABSTRACT

In accordance with the present invention, a method is provided for increasing the output of a geothermal steam turbine power plant comprising the steps of: providing a separate, additional flash separator that produces the steam for operating the non-condensable gas ejector; supplying all the geothermal steam produced by the main high-pressure flash separator to a high-pressure geothermal steam turbine; and whereby high-pressure geothermal fluid is supplied to both said separate, additional flash separator and said main high-pressure flash separator from the same production well in a pumped geothermal system. Furthermore, according to the present invention, apparatus is also provided for increasing the output of a geothermal steam turbine power plant comprising: a separate, additional flash separator that produces steam for operating the non-condensable gas ejector; supply means that ensures that all the geothermal steam produced by the main high-pressure flash separator is supplied to a high-pressure geothermal steam turbine; and a production well in a pumped geothermal system that supplies high-pressure geothermal fluid to both said separate, additional flash separator and said main high-pressure flash separator.

12 Claims, 2 Drawing Sheets

METHOD OF AND APPARATUS FOR INCREASING THE OUTPUT OF A GEOTHERMAL STEAM POWER PLANT

TECHNICAL FIELD

This invention relates to a method of and apparatus for increasing the output of a geothermal steam power plant, and more particularly, to a method of and apparatus for increasing the output of a geothermal steam turbine power plant.

BACKGROUND OF INVENTION

In recent times, energy and electricity production from geothermal sources has increased. This is because no fossil fuel has to be used in geothermal power plants and usually pollution from such geothermal power plants is minimal.

In more recent times, it has been found that a number of geothermal power plants previously built designed to operate at a certain inlet steam pressure suffer from a decline in the geothermal resource flow rate and pressure. The reduction in power output due to the reduction in steam flow rate and pressure becomes increasingly worse since the steam ejectors that are part of the vacuum system are very sensitive to the motive steam pressures. Thus, any decrease in steam supply pressure causes a drastic reduction in the effectiveness of the non-condensable gases (NCG) removal system that consequently affects the power plant performance.

It is therefore an object of the present invention to provide a new and improved method of and apparatus for increasing output a geothermal steam power plant wherein the disadvantages as outlined are reduced or substantially overcome.

BRIEF DESCRIPTION OF THE INVENTION

In accordance with the present invention, a method is provided for increasing the output of a geothermal steam turbine power plant comprising the steps of: providing a separate, additional flash separator that produces the steam for operating the non-condensable gas ejector; supplying all the geothermal steam produced by the main high-pressure flash separator to a high-pressure geothermal steam turbine; and whereby high-pressure geothermal fluid is supplied to both the separate, additional flash separator and the main high-pressure flash separator from the same production well in a pumped geothermal system. In accordance with the present invention, the high-pressure geothermal steam turbine operates on geothermal steam produced by the main high-pressure flash separator that is supplied with geothermal fluid from a pumped geothermal system as well as on spent, high temperature brine or geothermal liquid exiting the new, additional flash separator. In addition, the method also includes condensing the expanded geothermal steam exiting the geothermal steam turbine using a steam condenser for producing steam condensate and from which non-condensable gases are extracted. Furthermore, according to the present invention, these non-condensable gases are extracted from the steam condenser and supplied to the non-condensable gas (NCG) ejector operated by the steam supplied from the separate, additional flash separator. Additionally, the method of the present invention includes producing high-pressure geothermal steam and low-pressure geothermal steam using a double flash geothermal steam system included in the geothermal steam turbine power plant having a high-pressure flash separator and a low-pressure flash separator. Also, in accordance with the present invention, the low-pressure flash separator flashes brine or geothermal liquid exiting the high-pressure flash separator. Moreover, the method includes ensuring that the pressure of the steam exiting the separate, additional flash separator is higher than the operating pressure of the high-pressure flash separator of the high-pressure geothermal steam turbine.

Furthermore, according to the present invention, apparatus is also provided for increasing the output of a geothermal steam turbine power plant comprising: a separate, additional flash separator that produces steam for operating the non-condensable gas ejector; supply means that ensures that all the geothermal steam produced by the main high-pressure flash separator is supplied to a high-pressure geothermal steam turbine; and a production well in a pumped geothermal system that supplies high-pressure geothermal fluid to both said separate, additional flash separator and said main high-pressure flash separator. In accordance with the present invention, the high-pressure geothermal steam turbine operates on geothermal steam produced by the main high-pressure flash separator that is supplied with geothermal fluid from a pumped geothermal system as well as on spent, high temperature brine or geothermal liquid exiting the new, additional flash separator. In addition, the high-pressure geothermal steam turbine comprises a condensing geothermal steam turbine having a steam condenser for producing steam condensate and from which non-condensable gases are extracted. Furthermore, supply means are provided for supplying the non-condensable gases from the steam condenser to the non-condensable gas ejector operated by the steam supplied from the separate, additional flash separator. Additionally, the geothermal steam turbine power plant comprises a double flash geothermal steam system having a high-pressure steam separator and a low-pressure flash separator. Also, according to the present invention, the low-pressure flash separator receives and flashes brine or geothermal liquid exiting the high-pressure steam separator. Moreover, in accordance with the present invention, means are included that ensure that the pressure of the steam exiting the separate, additional flash separator is higher than the operating pressure of the high-pressure flash separator that supplies high-pressure geothermal steam to the high-pressure geothermal steam turbine.

BRIEF DESCRIPTION OF THE DRAWINGS

Embodiments of the present invention are described by way of example with reference to the accompanying drawings wherein.

Like reference numerals and designations in the various drawings refer to like elements.

DETAILED DESCRIPTION

Figure 1:
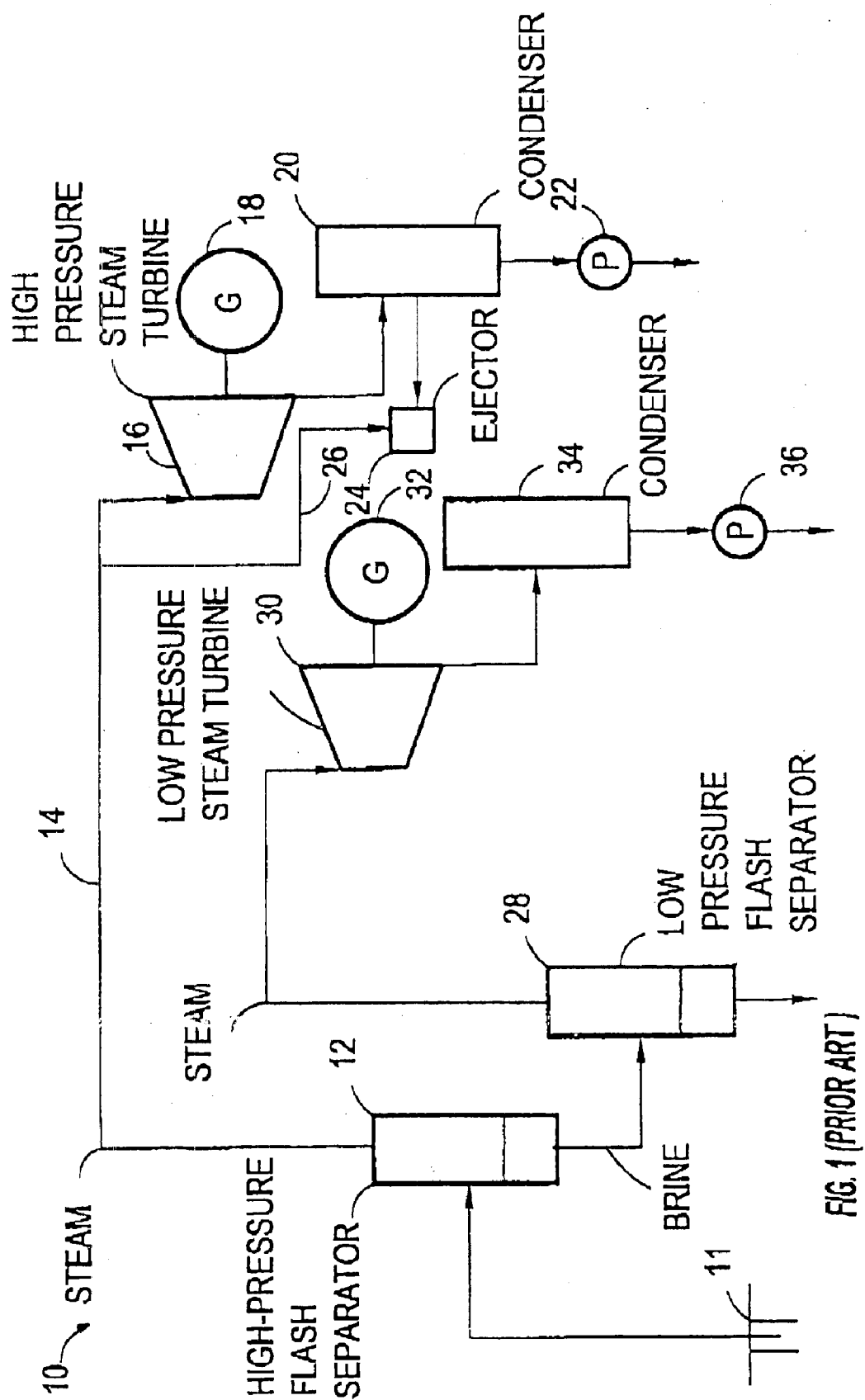
FIG. 1 is a block diagram of a power plant that operates according to the prior art.

Referring now to the drawings, reference numeral 10 of FIG. 1 designates a geothermal steam turbine power plant that operates according to the prior art. Power plant 10 includes high-pressure flash separator 12 for separating high-pressure geothermal fluid exiting production well 11 into high-pressure geothermal steam and geothermal liquid or brine. Production well 11 produces high-pressure geothermal fluid in a pumped geothermal system. The separated high-pressure geothermal steam is supplied via supply line 14 to high-pressure steam turbine 16 where it expands and does work. High-pressure steam turbine 16 drives electric generator 18 and produces electricity. Expanded geothermal steam exiting high-pressure steam turbine 16 is supplied to steam condenser 20 where steam condensate is produced and pump 22 extracts the steam condensate from the steam condenser for disposal. Non-condensable gases (NCG) present in steam condenser 20 are supplied to non-condensable gas (NCG) ejector 24 where high-pressure steam supplied from high-pressure steam turbine input line 14 to ejector 24 via line 26 operates the ejector. Such an arrangement reduces the power output of this turbine.

Geothermal liquid or brine exiting high-pressure flash separator 12 is supplied to low-pressure flash separator 28 where low-pressure geothermal steam is produced and supplied to low-pressure steam turbine 30. This low-pressure geothermal steam expands in this turbine and does work with low-pressure steam turbine 30 driving electric generator 32 that produces electricity. Expanded low-pressure geothermal steam exiting low-pressure steam turbine 30 is supplied to low-pressure steam condenser 34 and steam condensate produced is extracted by pump 36 for disposal.

Thus, in the arrangement described with relation to FIG. 1, the output of high-pressure steam turbine 16 is reduced due to the use of high-pressure geothermal steam from the input line of turbine 16 to operate non-condensable gas ejector 24.

Figure 2:
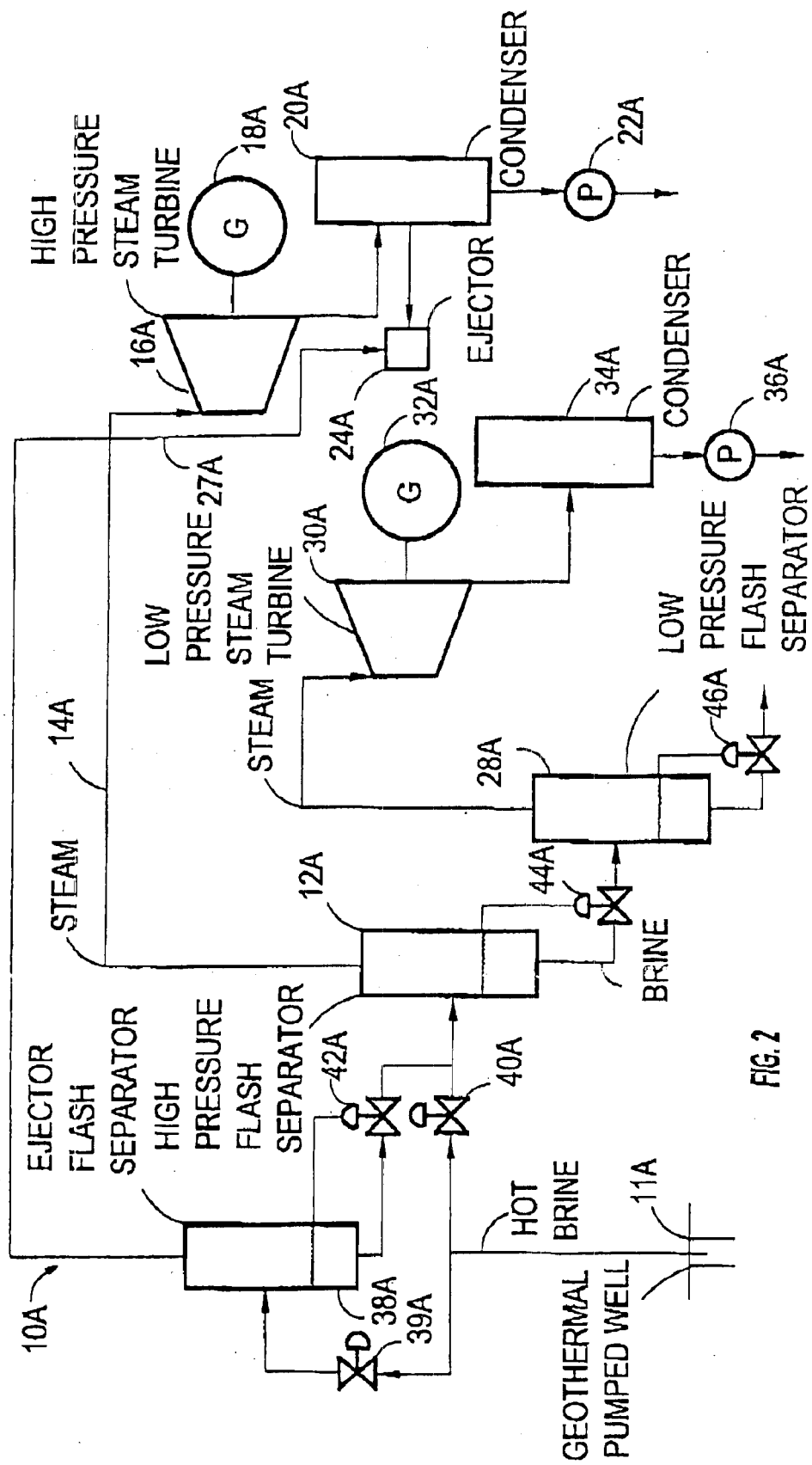
FIG. 2 is a block diagram of an embodiment of the present invention.
Figure 1:
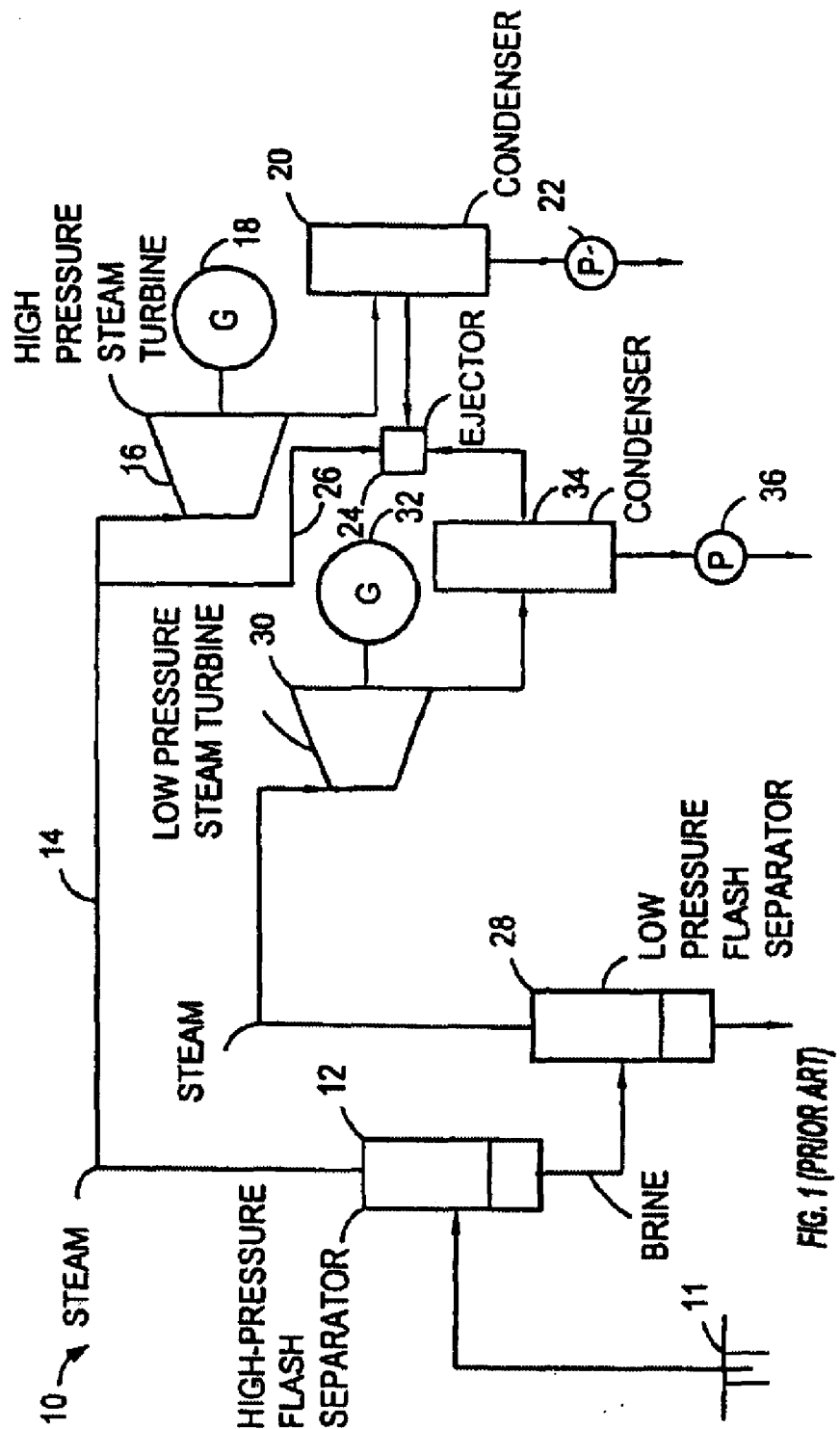
Figure 2:
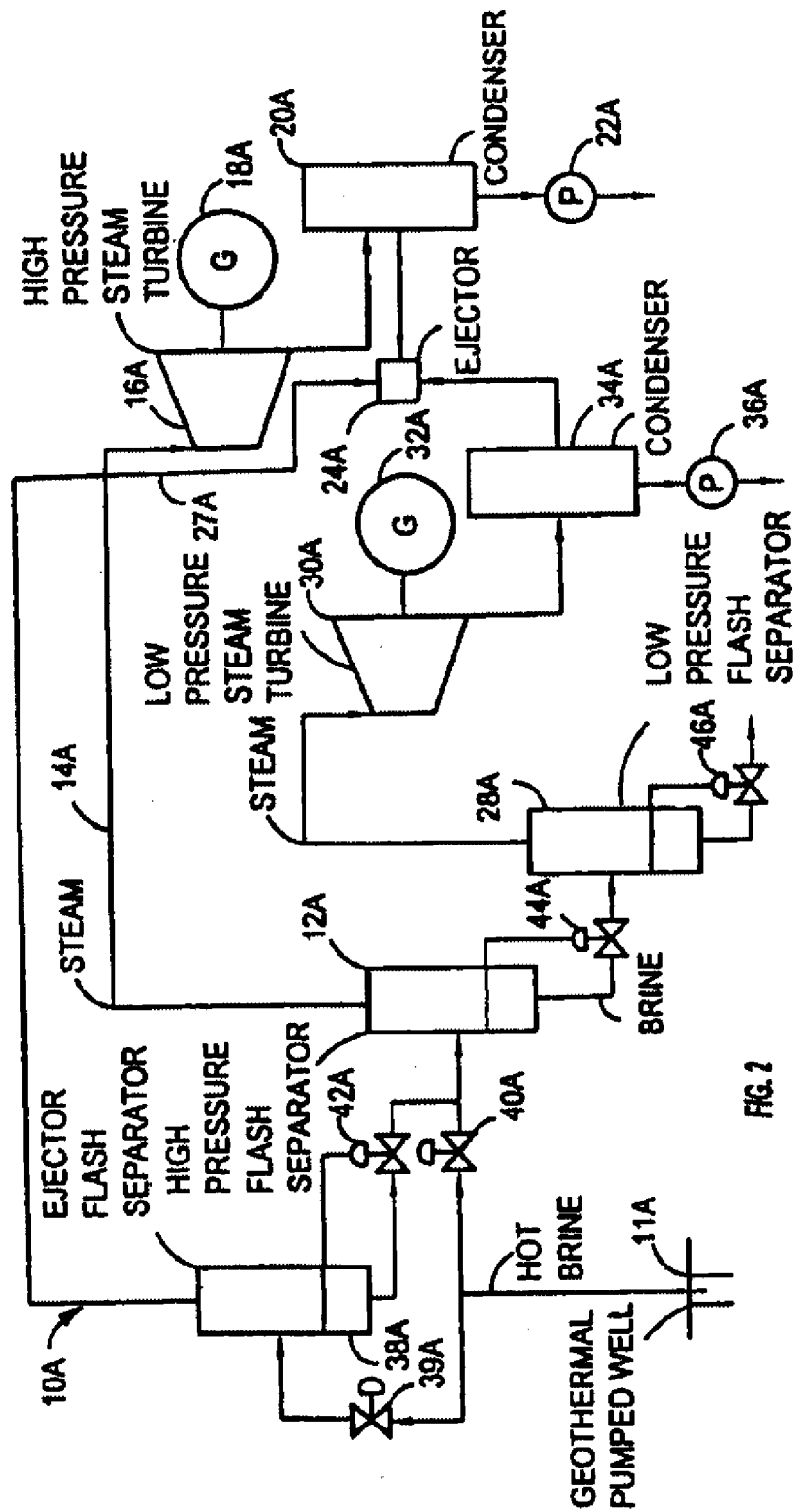

Turning now to FIG. 2, numeral 10A designates a geothermal steam turbine power plant designed and operated in accordance with the present invention. Power plant 10A includes high-pressure flash separator 12A for separating high-pressure geothermal fluid exiting production well 11A into high-pressure geothermal steam and geothermal liquid or brine. Production well 11A produces high-pressure geothermal fluid in a pumped geothermal system. The separated high-pressure geothermal steam is supplied via supply line 14A to high-pressure steam turbine 16A wherein it expands and does work. High-pressure steam turbine 16A drives electric generator 18A and produces electricity. Expanded geothermal steam exiting high-pressure steam turbine 16A is supplied to steam condenser 20A where steam condensate is produced and pump 22A extracts the steam condensate from the steam condenser for disposal. Non-condensable gases (NCG) present in steam condenser 20A are supplied to non-condensable gas (NCG) ejector 24A. In accordance with the present invention, high-pressure steam is supplied to ejector 24A via supply line 27A from separate, additional flash separator 38A, an ejector flash steam separator provided for producing the previously mentioned high-pressure steam. Separate, additional flash separator 38A receives high-pressure geothermal fluid from production well 11A via control valve 39A. Brine or liquid remaining in additional flash separator 38A is supplied via control valve 42A to high-pressure flash separator 12A. The pressure of the steam exiting additional flash separator 38A is higher than the operating pressure of high-pressure flash separator 12A. Consequently, the high-pressure steam turbine 16A can now produce increased work and thus more electricity is produced since all of the steam present in high-pressure inlet steam turbine input line 14A can now be utilized for producing power from high-pressure steam turbine 16A.

Geothermal liquid or brine exiting separator 12A is supplied low-pressure flash separator 28A where low-pressure geothermal steam is produced and supplied to low-pressure steam turbine 30A. This low-pressure geothermal steam expands in this turbine and does work with low-pressure steam turbine 30A driving electric generator 32A that produces electricity. Expanded low-pressure geothermal steam exiting low-pressure steam turbine 30A is supplied to low-pressure steam condenser 34A and steam condensate produced therein is extracted by pump 36A for disposal.

Furthermore, the present invention also includes the method for increasing the output of the geothermal steam turbine power plant 10A described with reference to FIG. 2.

Moreover, while the above description, presents a method of and apparatus for increasing the output of a geothermal steam power plant, the present invention can also be considered as a method of and apparatus for retrofitting an existing geothermal steam power plant for increasing its power output.

The advantages and improved results furnished by the method and apparatus of the present invention are apparent from the foregoing description of the preferred embodiment of the invention. Various changes and modifications may be made without departing from the spirit and scope of the invention as described in the appended claims.

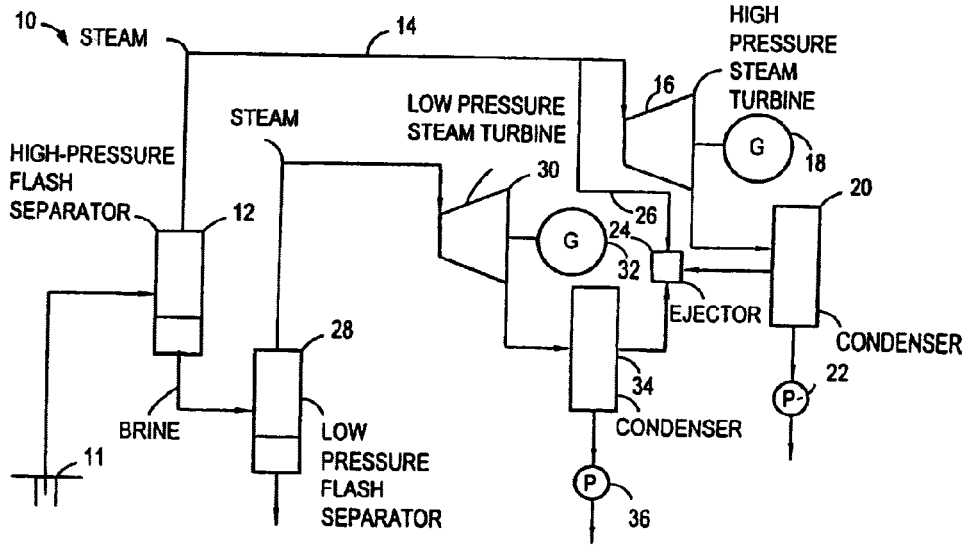

What is claimed is:

1. A method for increasing the output of a geothermal steam turbine power plant operating on geothermal steam separated by a main high-pressure flash separator from high pressure geothermal fluid, said method comprising the steps of:

(i) supplying all the geothermal steam produced by the main high-pressure flash separator to a high-pressure geothermal steam turbine, from which exits expanded geothermal steam;

(ii) providing a separate, additional flash separator that receives high pressure geothermal fluid and produces steam for operating a non-condensable gas ejector for ejecting non-condensable gases separated from said expanded geothermal steam; and (iii) whereby said high-pressure geothermal fluid is supplied to both said main high-pressure flash separator and said separate, additional flash separator from the same production well in a pumped geothermal system.

2. A method according to claim 1 including condensing the expanded geothermal steam exiting said geothermal steam turbine using a steam condenser for producing steam condensate and from which non-condensable gases are extracted.

3. A method according to claim 2 wherein said non-condensable gases are extracted from said steam condenser and supplied to said non-condensable gas ejector operated by the steam supplied from the separate, additional flash separator.

4. A method according to claim 1 including producing high-pressure geothermal steam and low-pressure geothermal steam using a double flash geothermal steam system included in said geothermal steam power plant having a high pressure steam separator and a low-pressure flash separator.

5. A method according to claim 4 wherein said low-pressure flash separator flashes brine or geothermal liquid exiting said high-pressure steam separator.

6. A method according to claim 4 including ensuring that the pressure of the steam exiting said separate, additional flash separator is higher than the operating pressure of the high-pressure flash separator of said high-pressure geothermal steam turbine.

7. Apparatus for increasing the output of a geothermal steam turbine power plant operating on geothermal steam separated by a main high pressure flash separator from high-pressure geothermal fluid, said apparatus comprising:

(i) supply means that ensures that all the geothermal steam produced by the main high-pressure flash separator is supplied to a high-pressure geothermal steam turbine, from which exits expanded geothermal steam;

(ii) a separate, additional flash separator that receives high pressure geothermal fluid and produces steam for operating a non-condensable gas ejector for ejecting non-condensable gases separated from said expanded geothermal steam; and (iii) a production well in a pumped geothermal system that supplies high-pressure geothermal fluid to both said main high-pressure flash separator and said separate, additional flash separator.

8. Apparatus according to claim 7 wherein said geothermal steam turbine comprises a condensing geothermal steam turbine having a steam condenser for producing steam condensate and from which non-condensable gases are extracted.

9. Apparatus according to claim 8 wherein supply means are provided for supplying said non-condensable gases from said steam condenser to said non-condensable gas ejector operated by the steam supplied from the separate, additional flash separator.

10. Apparatus according to claim 7 wherein said geothermal steam turbine power plant comprises a double flash geothermal system having a high-pressure steam separator and a low-pressure flash separator.

11. Apparatus according to claim 10 wherein said low-pressure flash separator receives and flashes brine or geothermal liquid exiting said high-pressure steam separator.

12. Apparatus according to claim 10 including means that ensure that the pressure of the steam exiting said separate, additional flash separator is higher than the operating pressure of the high-pressure flash separator of said high-pressure geothermal steam turbine.

\* \* \* \* \*

UNITED STATES PATENT AND TRADEMARK OFFICE
CERTIFICATE OF CORRECTION

PATENT NO. : 6,912,853 B2
DATED : July 5, 2005
INVENTOR(S) : Amir

It is certified that error appears in the above-identified patent and that said Letters Patent is hereby corrected as shown below:

The Title Page, showing an illustrative figure, should be deleted and substitute therefor the attached title page.

Delete Drawing Sheets 1-2 and substitute therefor the Drawing Sheets consisting of Fig. 1-2 as shown on the attached pages.

Signed and Sealed this

Thirteenth Day of September, 2005

JON W. DUDAS
*Director of the United States Patent and Trademark Office*

(12) United States Patent
Amir

(10) Patent No.: US 6,912,853 B2
(45) Date of Patent: *Jul. 5, 2005

(54) METHOD OF AND APPARATUS FOR INCREASING THE OUTPUT OF A GEOTHERMAL STEAM POWER PLANT

(75) Inventor: Nadav Amir, Rehovot (IL)

(73) Assignee: Ormat Technologies, Inc., Sparks, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/229,265

(22) Filed: Aug. 28, 2002

(65) Prior Publication Data

US 2004/0040303 A1 Mar. 4, 2004

(51) Int. Cl.[7] ............................ F01K 27/00; F03G 7/00
(52) U.S. Cl. ..................... 60/641.5; 60/648; 60/641.2
(58) Field of Search ....................... 60/641.5, 641.2, 60/648

(56) References Cited

U.S. PATENT DOCUMENTS

| | | | |
|---|---|---|---|
| 5,038,567 A | * | 8/1991 | Mortiz ..................... 60/641.5 |
| 5,671,601 A | * | 9/1997 | Bronicki et al. ............ 60/641.5 |
| 5,970,714 A | * | 10/1999 | Bronicki et al. ........... 60/641.5 |
| 6,212,890 B1 | * | 4/2001 | Amir ......................... 60/641.5 |

OTHER PUBLICATIONS

DiPippo, Ronald, Ph. D. "Small Geothermal Power Plants: Design, Performance and Economics." GHC Bulletin. Jun. 1999.

* cited by examiner

*Primary Examiner*—Sheldon J Richter
(74) *Attorney, Agent, or Firm*—Nath & Associates PLLC; Gary M. Nath; Jerald L. Meyer

(57) ABSTRACT

In accordance with the present invention, a method is provided for increasing the output of a geothermal steam turbine power plant comprising the steps of: providing a separate, additional flash separator that produces the steam for operating the non-condensable gas ejector; supplying all the geothermal steam produced by the main high-pressure flash separator to a high-pressure geothermal steam turbine; and whereby high-pressure geothermal fluid is supplied to both said separate, additional flash separator and said main high-pressure flash separator from the same production well in a pumped geothermal system. Furthermore, according to the present invention, apparatus is also provided for increasing the output of a geothermal steam turbine power plant comprising: a separate, additional flash separator that produces steam for operating the non-condensable gas ejector; supply means that ensures that all the geothermal steam produced by the main high-pressure flash separator is supplied to a high-pressure geothermal steam turbine; and a production well in a pumped geothermal system that supplies high-pressure geothermal fluid to both said separate, additional flash separator and said main high-pressure flash separator.

12 Claims, 2 Drawing Sheets